United States Patent [19]

Niihara

[11] Patent Number: 5,142,360
[45] Date of Patent: Aug. 25, 1992

[54] MOTION VECTOR DETECTION CIRCUIT USED IN HIERARCHICAL PROCESSING OF MOVING PICTURE SIGNAL

[75] Inventor: Takami Niihara, Yokosuka, Japan

[73] Assignee: Victor Company of Japan, Ltd., Yokohama, Japan

[21] Appl. No.: 664,887

[22] Filed: Mar. 5, 1991

[30] Foreign Application Priority Data

Mar. 6, 1990 [JP] Japan .................................. 2-56123

[51] Int. Cl.⁵ .............................................. H04N 7/13
[52] U.S. Cl. .................................... 358/105; 358/136
[58] Field of Search ................ 358/105, 140, 136, 138

[56] References Cited

U.S. PATENT DOCUMENTS

| | | | |
|---|---|---|---|
| 4,853,775 | 8/1989 | Rouvrais et al. | 358/105 |
| 4,864,398 | 9/1989 | Avis et al. | 358/140 |
| 4,989,087 | 1/1991 | Pele et al. | 358/105 X |
| 5,031,039 | 7/1991 | Haghiri et al. | 358/105 X |

FOREIGN PATENT DOCUMENTS

2-285816 4/1989 Japan .
2-192378 7/1990 Japan .

*Primary Examiner*—Victor R. Kostak
*Attorney, Agent, or Firm*—Michael N. Meller

[57] ABSTRACT

In this motion detection circuit, in detecting motion vectors by using a block of L×M pixels as a unit between images An and Bn of respective hierarchies in which predetermined sampling operations are implemented to an input image A and a comparative image B at n-stages in both horizontal and vertical directions, motion vectors of adjacent blocks of motion vectors detected at the (i−1) stage are taken into consideration as an initial value of motion vector detection at the i-th stage. This detection circuit further comprises a circuit for providing the initial value by using image data at the (i−1)-th stage corresponding to motion vectors of the adjacent blocks.

6 Claims, 8 Drawing Sheets

MOTION VECTOR DETECTION CIRCUIT USED IN HIERARCHICAL PROCESSING OF MOVING PICTURE SIGNAL

BACKGROUND OF THE INVENTION

This invention relates to a motion vector detection used in the motion-compensated predictive coding known as a technique for compressing a digital moving picture, and more particularly to a motion vector detection circuit for implementing sampling to an input image and a comparative image at multi-stages to carry out motion vector detection in a hierarchical manner.

Figure 1A:
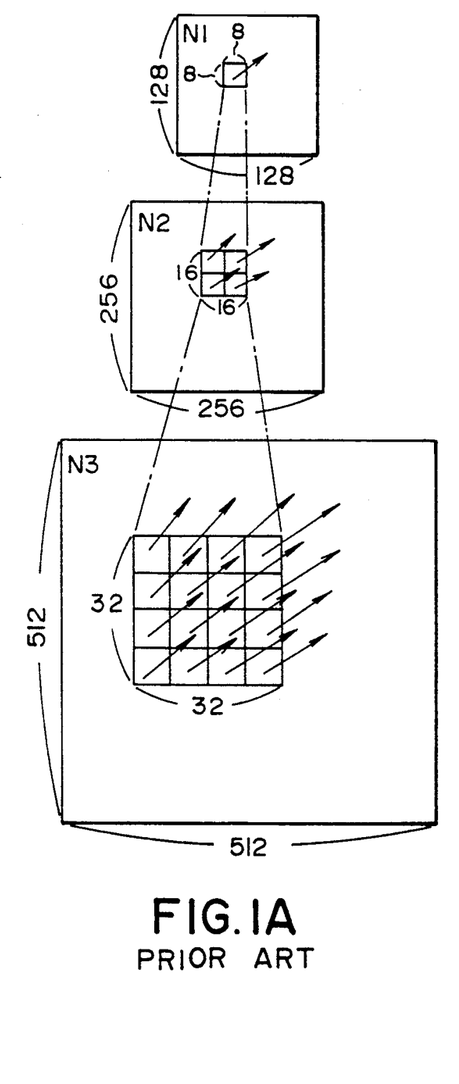
FIGS. 1A and 1B are an explanatory view showing a typical image sampling.
Figure 1B:
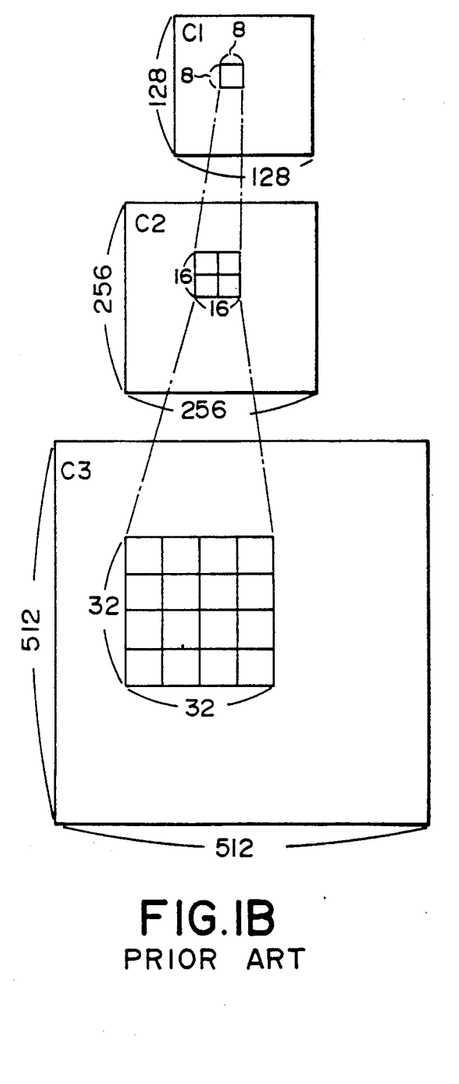
Figure 2:
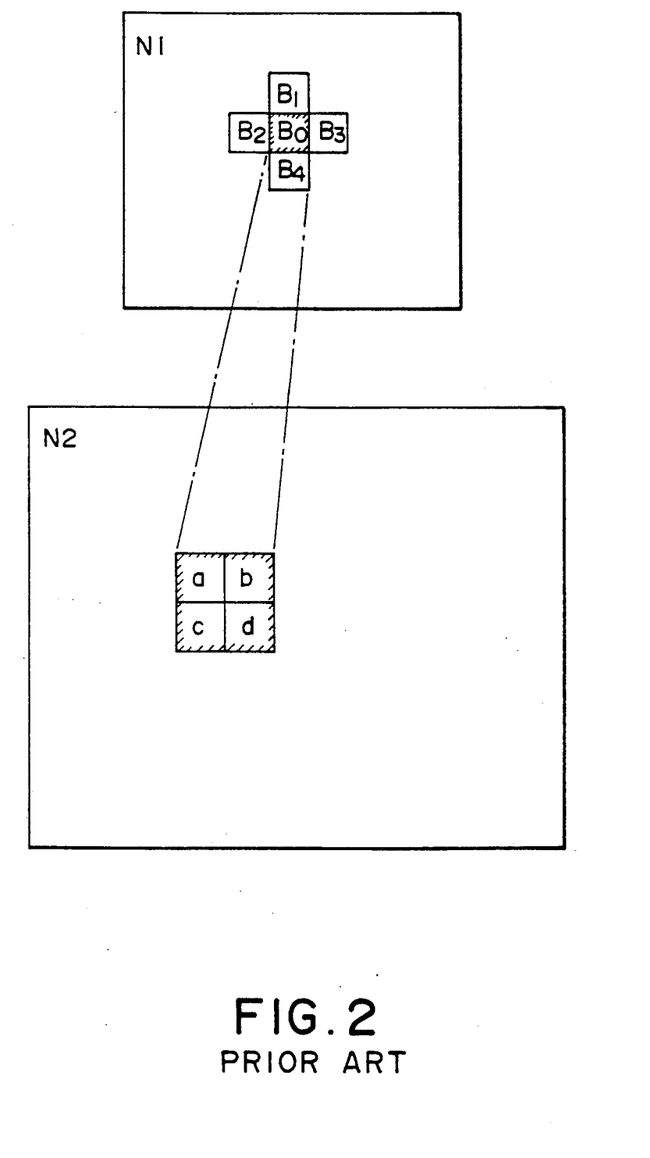
FIG. 2 is an explanatory view showing an example of adjacent blocks taken into consideration at the time of determination of an initial motion vector.

As the conventional hierarchical motion vector detection technique, there is known a technique shown in FIGS. 1 and 2. The principle of the hierarchical motion vector detection technique is shown in FIG. 1, and the block of a hierarchical image is shown in FIG. 2. Explanation will now be given by taking an example of the case where an image subject to processing is constituted by 512×512 pixels to carry out motion vector detection at three stages using a block constituted by 8×8 pixels as a unit.

As shown in FIG. 1A, an input image N3 is subjected to ½ subsampling in both horizontal and vertical directions, resulting in an input image N2. The input image N3 is also subjected to ¼ subsampling in both horizontal and vertical directions, resulting in an input image N1. Namely, 8×8 pixels of the input image N1 at the first stage correspond to 16×16 pixels of the input image N2 at the second stage, and further correspond to 32×32 pixels of the input image N3 at the third stage.

On the other hand, as shown in FIG. 1B, similar subsampling is implemented also to the comparative image C3 for detecting the motion vector. Namely, a comparative image C3 is subjected to ½ sampling in both horizontal and vertical directions, resulting in a comparative image C2. The comparative image C3 is also subjected to ¼ sampling, resulting in a comparative image C1. Namely, 8×8 pixels of the comparative image C1 at the first stage correspond to 16×16 pixels of the comparative image C2 at the second stage, and further correspond to 32×32 pixels of the comparative image C3 at the third stage.

Initially, in the motion vector detection at the first stage, the input image N1 and the comparative image C1 are used. The input image N1 is divided into blocks of 8×8 pixels. Then, block matching using full search method is carried out every block in a search region of ±7 pixels in both horizontal and vertical directions of corresponding blocks on the comparative image C1.

Subsequently, in the motion vector detection at the second stage, the input image N2 is similarly divided into blocks of 8×8 pixels. Then, a motion vector having the length twice larger than that of three motion vectors in total of a corresponding block of the input image N1 at the first stage and adjacent blocks thereof is used to carry out matching processing. As a result, a search in a range of ±1 pixel in both horizontal and vertical directions of a motion vector in which an error becomes minimum is carried out. Thus, motion vectors at the second stage are detected.

For example, as shown in FIG. 2, processing blocks at the second stage are assumed as a, b, c and d. Further, a block at the first stage corresponding to these blocks a, b, c and d is assumed as Bo. In this case, as the adjacent blocks, motion vectors of the blocks $B_1$ and $B_2$ are used with respect to the block a; motion vectors of the blocks $B_1$ and $B_3$ are used with respect to the block b; motion vectors of the blocks $B_2$ and $B_4$ are used with respect to the block c; and motion vectors of the blocks $B_3$ and $B_4$ are used with respect to the block d.

Similarly, at the third stage, the input image N3 is divided into blocks of 8×8 pixels, and similar processing is implemented to these divided blocks. Thus, detection of motion vectors at the three stage is carried out.

Figure 3:
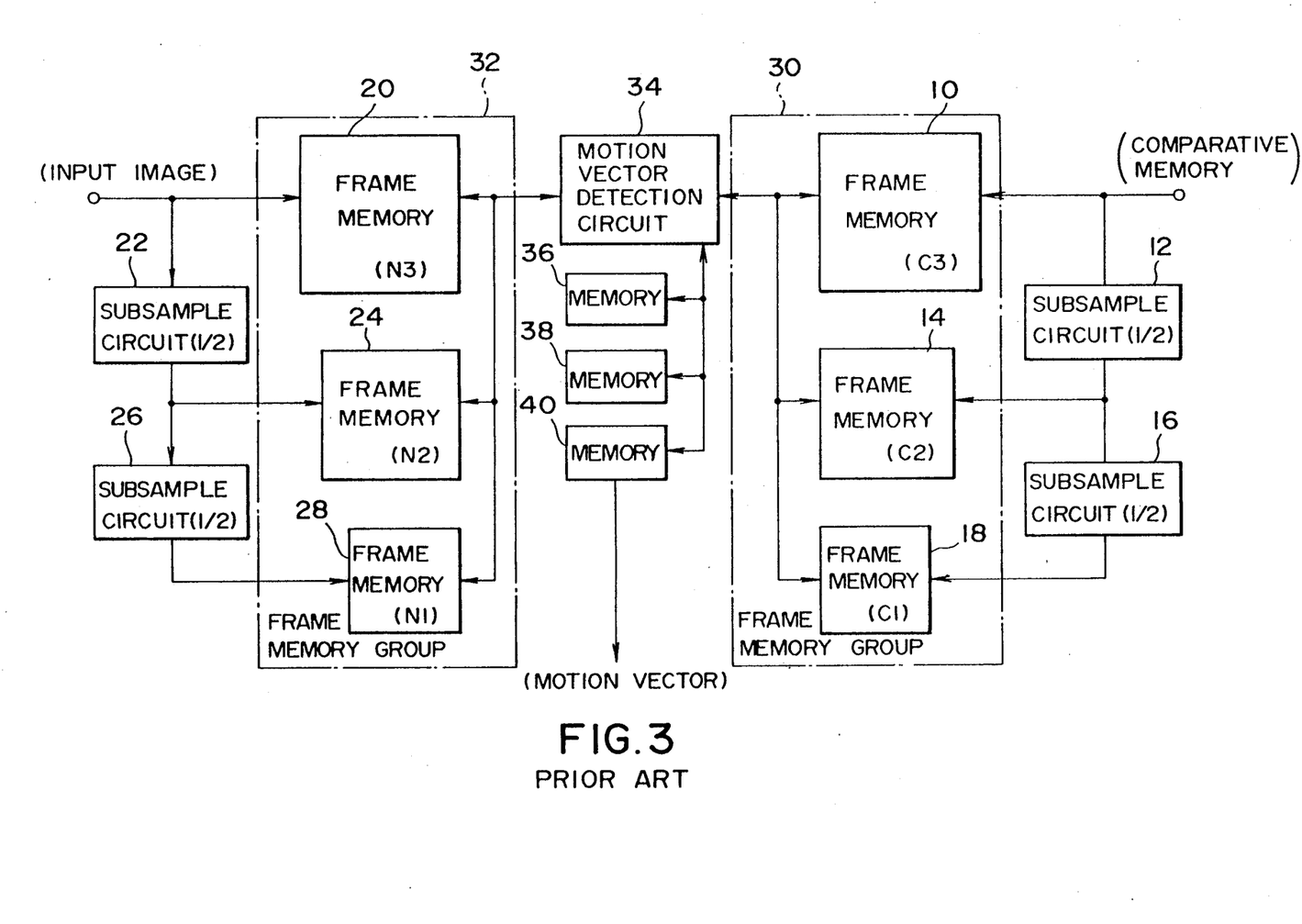
FIG. 3 is a block diagram showing a typical configuration of a motion vector detection circuit.

The above-mentioned motion vector detection processing is carried out by using, e.g., a circuit shown in FIG. 3. In this figure, a comparative image C3 is stored into a frame memory 10 on one hand, and is subjected to ½ subsampling in both horizontal and vertical directions at a subsample circuit 12 on the other hand. A comparative image C2 generated by this subsampling is stored into a frame memory 14 on one hand, and is subjected to ½ subsampling in both horizontal and vertical directions at a subsample circuit 16 on the other hand. A comparative image C1 generated by this subsampling is stored into a frame memory 18.

On the contrary, an input image N3 is stored into a frame memory 20 one one hand, and is subjected to ½ subsampling in both horizontal and vertical directions at a subsample circuit 22 on the other. An input image N2 generated by this subsampling is stored into a frame memory 24 on one hand, and is subjected to ½ subsampling in both horizontal and vertical directions at a subsample circuit 26 on the other hand. An input image N1 generated by this subsampling is stored into a frame memory 28.

Image data stored into respective frame memory groups 30 and 32 in a manner stated above are suitably read out by a motion vector detection circuit 34. Detected results are stored into memories 36, 38 and 40, respectively. Thus, a final motion vector output is provided from the memory 40.

Figure 4:
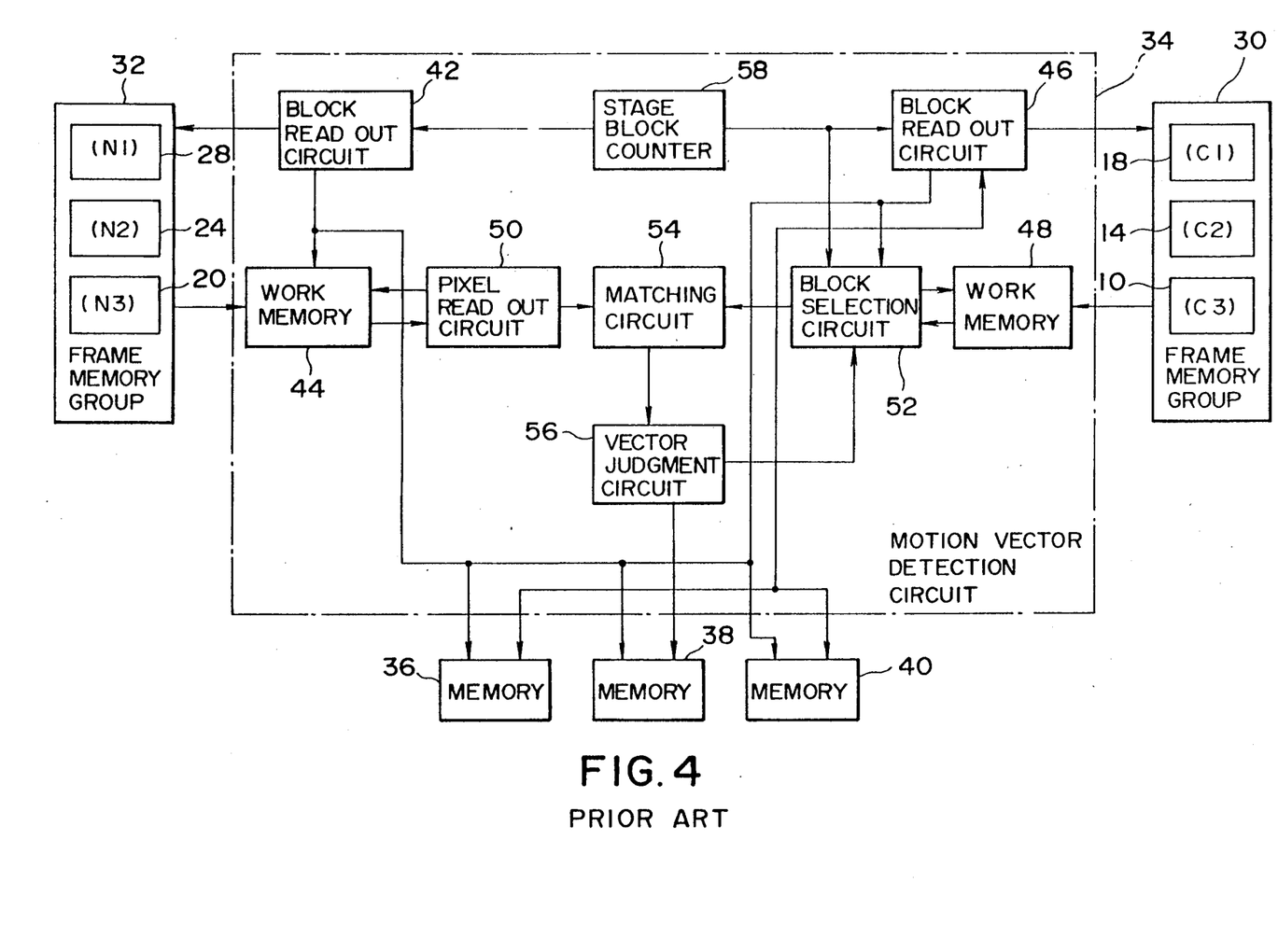
FIG. 4 is a block diagram showing a conventional motion vector detection circuit.

The detail of the above-described motion vector detection circuit 34 is shown in FIG. 4. The operation of this circuit is as follows.

a. Motion vector detection at the first stage

In this case, on the input image side, one block of 8×8 pixels is read out from the frame memory 28 by means of a block readout circuit 42, and is stored into a work memory 44.

As described above, the search range at the first stage is ±7 pixels in both horizontal and vertical directions. For this reason, on the comparative image side, corresponding data of 22×22 pixels is read out from the frame memory 18 by means of a block readout circuit 46, and is stored into a work memory 48.

Figure 5A:
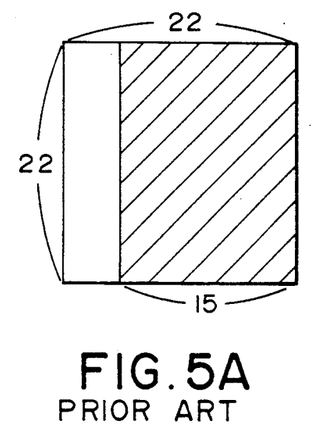
FIGS. 5 to 7 are explanatory views showing the operation of the conventional circuit.
Figure 5B:
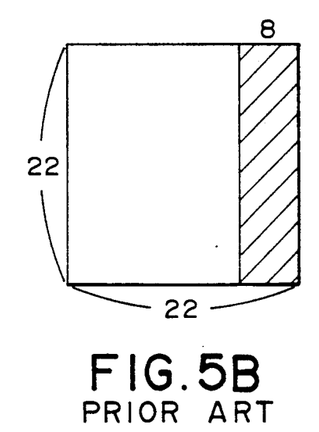

At this time, pixel data newly delivered from the frame memory 18 to the work memory 48 has a data size of 15×22 pixels as shown in FIG. 5A in the case where a block subject to detection is the block at the left edge of the input image N1. Further, that pixel data has a size of 8×22 pixels as shown in FIG. 5B in the case where the block subject to detection is another block than the above.

Then, on the input image side, data of blocks stored in the work memory 44 are read out per each pixel by means of a pixel readout circuit 50. On the other hand, on the comparative image side, data of blocks corresponding to 225 trial vectors are sequentially read out from the work memory 48 per each pixel by means of a block selection circuit 52. In other words, in the search range of ±7 pixels centering the block of 8×8 pixels, there exist 15×15 blocks, and there exist trial vectors for respective blocks. Thus, data are sequentially read out for respective trial vectors, and are compared with those on the input image side.

Respective readout data by the pixel readout circuit 50 and the block selection circuit 52 are all delivered to a matching circuit 54. In the matching circuit 54, errors between pixels, e.g., mean square error (MSE) or mean absolute error (MAD) are calculated for 225 trial vectors respectively. Errors thus calculated and trial vectors are delivered to a vector judgment circuit 56.

In the vector judgment circuit 56, comparisons among the 225 errors sequentially inputted are carried out, and the minimum value of the errors and a trial vector corresponding thereto are found out. The trial vector thus found is written into the memory 36 as a motion vector at the first stage.

The above-mentioned operation is carried out every block included in the input image N1 at the first stage. Thus, motion vectors are determined with respect to such blocks, respectively.

b. Motion vector detection at the second stage

In this case, initially, on the input image side, one block of $8 \times 8$ pixels is read out from the frame memory 24 by means of the block readout circuit 42, and is stored into the work memory 44.

On the other hand, on the comparative image side, three motion vectors in total of a motion vector of a block at the first stage corresponding to the block read out at the second stage and motion vectors of two blocks adjacent thereto (see FIG. 2) are read out from the memory 36 by means of the block readout circuit 46. Then, blocks of $10 \times 10$ pixels corresponding to vectors twice larger than these motion vectors at the first stage are read out from the frame memory 14 by means of the block readoutcircuit 42 for the three motion vectors at the first stage, and are written into the work memory 48 (see FIG. 6).

Figure 7:
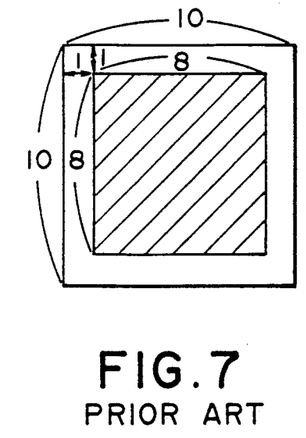

Then, a block of the block center $8 \times 8$ pixels shown in FIG. 7 for each of the three blocks of $10 \times 10$ pixels written into the work memory 48 in a manner stated above and a motion vector corresponding thereto are delivered to the matching circuit 54.

Figure 6:
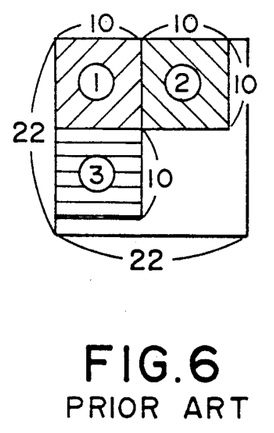

To the matching circuit 54, input image side data of blocks of $8 \times 8$ pixels are inputted from the work memory 44. Thus, the matching processing therebetween is carried out. As a result, a block in which an error becomes minimum and a motion vector thereof are determined by means of the vector judgment circuit 56. Thus, a number of the motion vector shown in FIG. 6 is delivered to the block readout circuit 46.

Data of $10 \times 10$ pixels in the work memory 40 corresponding to the determined motion vector is used to perform the operation similar to that at the abovedescribed first stage in the search range of $\pm 1$ pixel in horizontal and vertical directions except for the center. Namely, matching between the blocks in the search range and the blocks stored in the work memory 44 is carried out at the matching circuit 54. Thus, errors and motion vectors are delivered to the vector judgment circuit 56. Then, eight comparisons with the minimum error previously detected are carried out at the vector judgment circuit 56. Thus, detection of the minimum error and the motion vector detection at the second stage corresponding thereto are carried out. This motion vector at the second stage is written into the memory 38.

The above-mentioned operation is carried out for respective blocks included in the input image N2 at the second stage. Thus, motion vectors are determined with respect to respective blocks.

c. Motion vector detection at the third stage

In the same manner as that at the second stage, motion vector detection at the third stage is carried out by using detected motion vectors at the second stage and respective images N3 and C3 at the third stage. The detected motion vectors at the third stage are written into the memory 40. Thus, motion vectors between the input image N3 and the comparative image C3 are finally detected.

In the above-mentioned respective operations, the count operation of respective stages is carried out by means of a stage block counter 58.

With the conventional motion vector detection technique as described above, however, there exists an inconvenience described below. Assuming now that the number of pixels of initial images N3 and C3 is $512 \times 512$, the number of blocks of $8 \times 8$ pixels is $64 \times 64$. Further, the number of pixels of images N2 and C2 at the second stage is $256 \times 256$, and the number of blocks of $8 \times 8$ pixels is $32 \times 32$. In addition, the number of pixels of images N1 and C1 at the first stage is $128 \times 128$, and the number of blocks of $8 \times 8$ pixels is $16 \times 16$. For this reason, the number of pixels read out from the frame memory 18 at the first stage is expressed as follows:

$$15 \times 22 \times 16 + 8 \times 22 \times 16 \times 15 = 47520$$

Further, the number of pixels read out from the frame memory 14 at the second stage is expressed as follows:

$$10 \times 10 \times 3 \times 32 \times 32 = 307200$$

In addition, the number of pixels read out from the memory 10 at the third stage is expressed as follows:

$$10 \times 10 \times 3 \times 64 \times 64 = 1228800$$

The sum total of the above-mentioned number of pixels is equal to 1583520.

On the other hand, the number of one frame is expressed as follows:

$$512 \times 512 = 262144$$

As is clear from the comparison therebetween, the number of pixels read out at the time of vector detection is about six times or more than the value of the sampling frequency. For this reason, the prior art has the inconvenience that it is necessary to provide an access to the frame memory at a high speed.

SUMMARY OF THE INVENTION

This invention has been made with the abovementioned problems in view, and its object is to provide a motion vector detection circuit capable of reducing the access speed to the frame memory, and lessening the burden on operation.

This invention is directed to a motion vector detection circuit wherein, in detecting motion vectors, by using a block of $L \times M$ pixels as a unit, between images An and Bn of respective hierarchies in which predetermined sampling operations are implemented to an input image A and a comparative image B at n-stages in both horizontal and vertical directions, motion vectors of adjacent blocks of motion vectors detected at the $(i-1)$-th stage are taken into consideration as an initial value of motion vector detection at the i-th stage, characterized in that there is provided a circuit for providing the initial value by using image data at the (i−1)-th stage corresponding to motion vectors of the adjacent blocks.

In accordance with this invention, the input image A and the comparative image B are subjected to $\frac{1}{2}$, $\frac{1}{4}$ ... $\frac{1}{2^n}$ subsampling in both horizontal and vertical directions. Thus, hierarchical images An and Bn are first determined (n=1, 2, 3, ...). Then, detection of motion vectors by using a block of L×M pixels as a unit is carried out between these images An and Bn.

In carrying out this detection, an initial value of motion vectors is determined under the state where motion vectors of a block of $A_{i-1}$ corresponding to any block of an input image $A_i$ and adjacent blocks thereof are taken into consideration. Determination of the initial values is carried out by using blocks of (L/2)×(M/2) pixels of an input image $A_{i-1}$ corresponding to processing blocks of the input image $A_i$ and blocks of (L/2)×(M/2) pixels of a comparative image $B_{i-1}$ corresponding to motion vectors of adjacent blocks. Thus, the number of accesses with respect to pixel data included in images of respective hierarchies can be reduced to substantially one half.

As described above, in accordance with a motion vector detection circuit according to this invention, in taking into consideration adjacent ones of motion vectors detected at the (i−1)-th stage as an initial value of the motion vector detection at the i-th stage, image data of the (i−1) stage corresponding to those adjacent motion vectors is used. Accordingly, the number of accesses to the storage memory for image data of respective hierarchies is reduced. Thus, the access speed is reduced, advantageously lessening the operation burden.

DETAILED DESCRIPTION OF THE PREFERRED EMBODIMENTS

Preferred embodiments of a motion vector detection circuit according to this invention will now be described with reference to the attached drawings. The same reference numerals are used for the same components as those of the above-described prior art.

First embodiment

Figure 8:
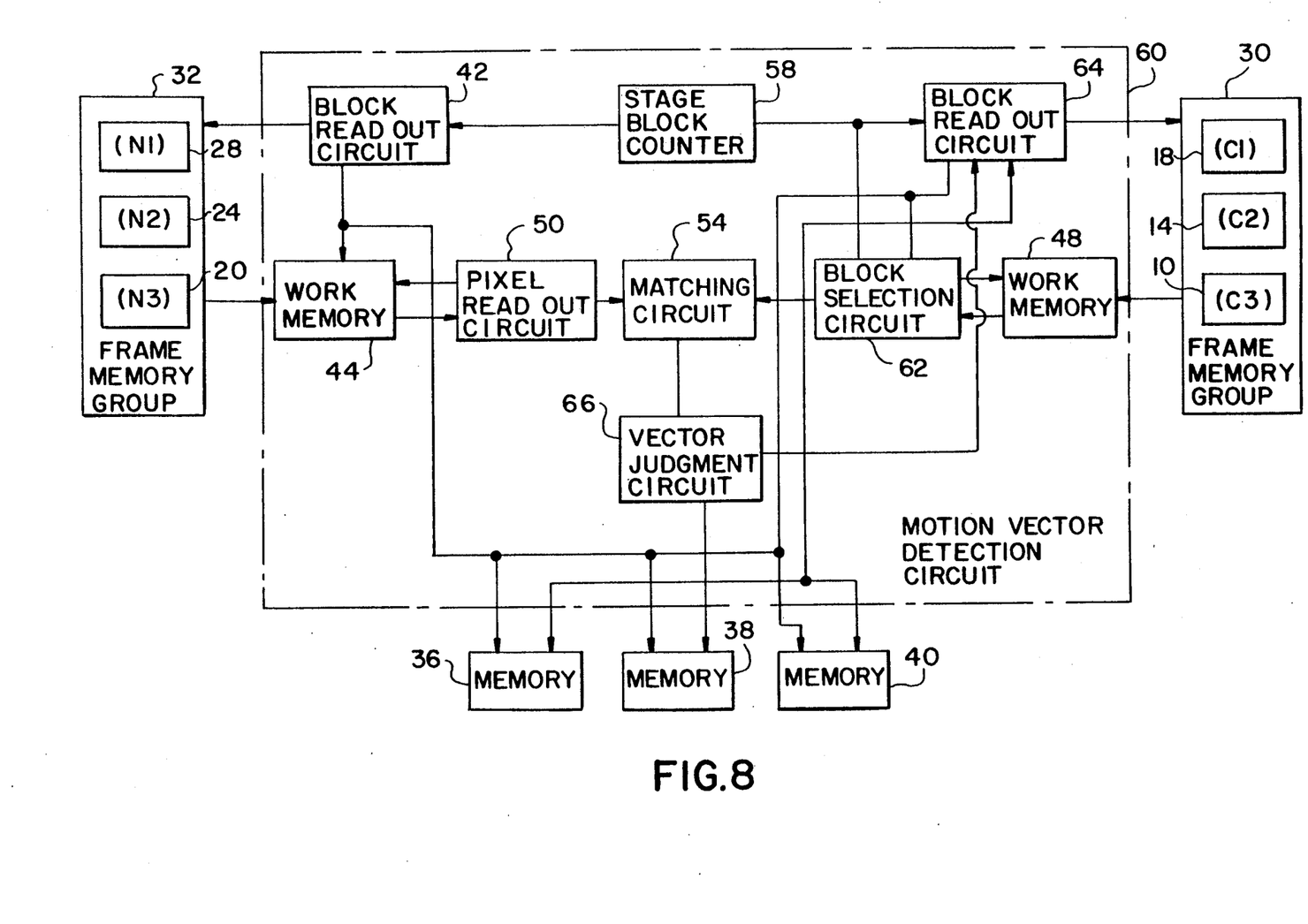
FIG. 8 is a block diagram showing a first embodiment of a motion vector detection circuit according to this invention.

Initially, a first embodiment of this invention will now be described with reference to FIGS. 8 to 11. The principal components of the first embodiment are shown in FIG. 8.

In correcting or modifying motion vectors by using adjacent blocks in the motion vector detection at the N-th stage, e.g., the second stage, in accordance with the prior art, pixel data included in the comparative image C2 of the second stage (see FIG. 6) is used, whereas, in accordance with this embodiment, pixel data of the comparative image C1 of the (N−1)-th stage, i.e., the first stage is used.

The motion vector detection circuit 60 according to the first embodiment differs from the circuit of the prior art shown in FIG. 4 in that a output side of the vector judgment circuit 66 is connected to the input side of a block readout circuit 64. The entire circuit configuration of the motion vector detection circuit is the same as that of the prior art shown in FIG. 3. Accordingly, data of images N1, N2, N3, C1, C2 and C3 at respective stages respectively stored into the frame memory groups 30 and 32 are the same as those of the prior art.

Figure 9:
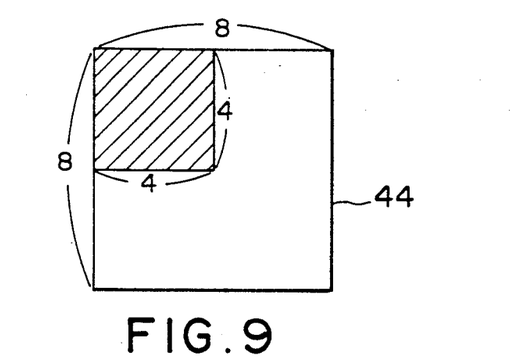
FIGS. 9 to 11 are explanatory views showing the operation of the first embodiment.
Figure 10:
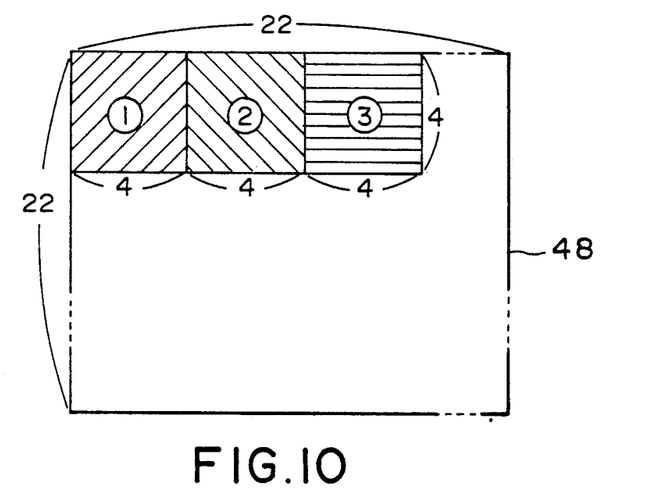
Figure 11:
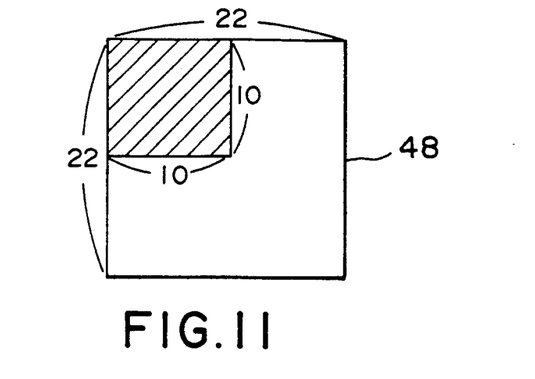

The operation of the first embodiment thus constructed will now be described with reference to FIGS. 9 to 11.

a. Motion vector detection at the fist stage

The operation in this case is the same as that of the above-described prior art. Thus, motion vectors are detected for respective blocks included in the input image N1 at the first stage, and are written into the memory 36.

b. Motion vector detection at the second stage

The operation of the motion vector detection at the second stage will now be described. In this case, the processing using images N1 and C1 at the first stage is carried out.

On the input image side, pixel addresses of one block of 4×4 pixels of the input image N1 corresponding to a block (an objective block) of 8×8 pixels of the input image N2 subject to processing are determined at the block readout circuit 42. An access to each corresponding address of the frame memory 28 is carried out by means of the block readout circuit 42. Thus, the block of 4×4 pixels of the first stage input image N1 is read out, and is stored into the work memory 44 (see FIG. 9).

On the other hand, on the comparative image side, three motion vectors in total of a motion vector of a block at the first stage corresponding to the object block of 8×8 pixels of the input image N2 and motion vectors of adjacent two blocks thereof are read out from the memory 36 by means of the block readout circuit 64. Then, pixel addresses of the block of 4×4 pixels at the first stage corresponding to respective three motion vectors are determined at the block readout circuit 64. An access to each corresponding address of the frame memory 18 is carried out by means of the block readout circuit 64. Thus, three blocks of 4×4 pixels of the first stage comparative image C1 corresponding to three motion vectors are read out, and are stored into the work memory 48 (see FIG. 10).

Then, comparisons between block of 4×4 pixels stored in the work memory 44 (see FIG. 9) and three blocks of 4×4 pixels stored in the work memory 48 (see FIG. 10) are carried out in sequence at the matching circuit 54. Error and trial vectors thus determined are delivered to a vector judgment circuit 66.

At the vector judgment circuit 66, comparisons among three errors inputted in sequence are carried out. As a result, detection of a minimum value and detection of a trial vector corresponding thereto are carried out.

The trial vector thus detected is delivered to the block readout circuit 64.

After such an operation, processing using images N2 and C2 at the second stage is carried out. Initially, on the input image side, one block of 8×8 pixels subject to processing is read out from the frame memory 24 by means of the block readout circuit 42 and is written into the work memory 44. On the other hand, on the comparative image side, a block of 10×10 pixels is read out by means of the block readout circuit, 64 from the frame memory 14 from the position corresponding to a vector having the length twice larger than that of the detected trial vector. These data are stored into the work memory 48 as shown in FIG. 11.

By using the block of 8×8 pixels of the work memory 44 and the block of 10×10 pixels of the work memory 48, in the search range of ±1 pixel in horizontal and vertical directions, nine comparing operations are carried out at the matching circuit 54. Errors and trial vectors thus provided are delivered in sequence to the vector judgment circuit 66.

At the vector judgment circuit 66, comparisons among nine errors inputted in sequence are carried out. Thus, detection of the minimum error and motion vector detection at the second stage corresponding thereto are carried out. Motion vectors at the second stage are written into the memory 38.

The above-mentioned operation is carried out for respective blocks included in the input image N2 at the second stage, and motion vectors are determined for respective blocks.

c. Motion vector detection at the third stage

Motion vector detection at the third stage is carried out also in the same manner as in the second stage. Namely, comparisons by three trial vectors using blocks of 4×4 pixels in the images N2 and C2 at the second stage are carried out. Then, search of ±1 pixel in horizontal and vertical directions by blocks of 8×8 pixels in the images N3 and C3 of the three stage is carried out.

Detected motion vectors at the three stage are written into the memory 40. Thus, motion vectors between the input image N3 and the comparative image C3 are finally detected.

In accordance with the first embodiment, in the same manner as in the prior art, the number of pixels read out from the frame memory at the first stage is expressed as follows:

$$15 \times 22 \times 16 + 8 \times 22 \times 16 \times 15 = 47520$$

However, the number of pixels read out from the frame memories 18 and 14, respectively, at the second stage are expressed as follows:

$$4 \times 4 \times 3 \times 32 \times 32 = 49152$$

$$10 \times 10 \times 32 \times 32 = 102400$$

Further, the number of pixels read out from the frame memory 14 at the third stage is expressed as follows:

$$4 \times 4 \times 3 \times 64 \times 64 = 196608$$

In addition, the number of pixels read out from the frame memory 10 is expressed as follows:

$$10 \times 10 \times 64 \times 64 = 409600$$

The sum total of these pixels is equal to 907680 pixels. Compared with the above-described prior art, it is sufficient to read out pixel data approximately one half of that of the prior art.

Further, in detecting a single optimum initial vector from three initial vectors, matching by blocks of 8×8 pixels is conducted in the prior art, whereas, in accordance with this embodiment, matching by blocks of 4×4 pixels is conducted to carry out initial vector detection. Thus, quantity of operation is reduced.

Second embodiment

Figure 12:
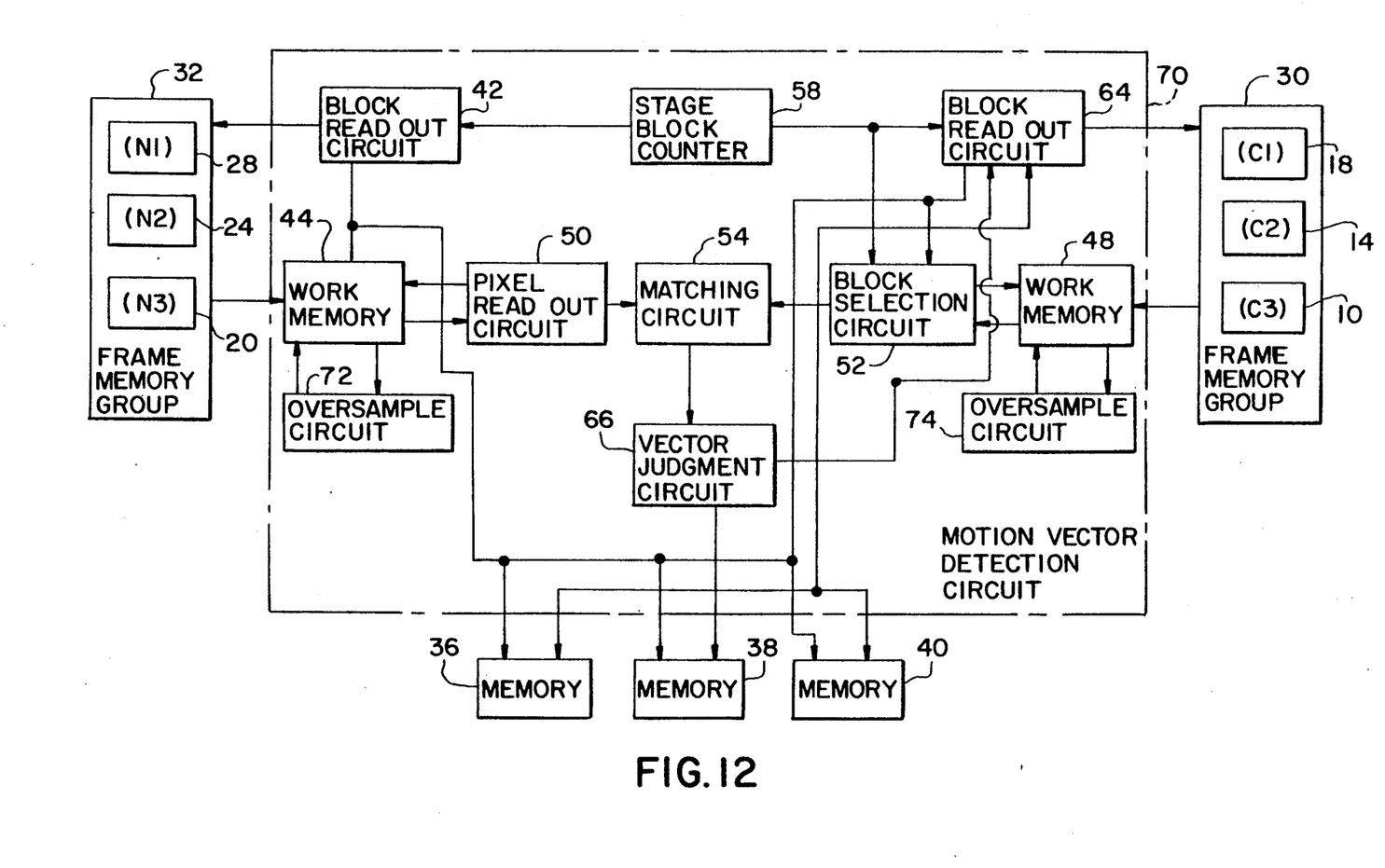
FIG. 12 is a block diagram showing a second embodiment of this invention.

A second embodiment of this invention will now be described with reference to FIG. 12. In a motion vector detection circuit 70 according to the second embodiment, there is employed an arrangement such that over-sample circuits 72 and 74 are connected to work memories 44 and 48, respectively.

In the second embodiment, the operation in the motion vector detection at the three stage differs from that of the above-mentioned first embodiment. Namely, in place of reading data of 10×10 pixels from the frame memories 10 and 20, respectively, data of 12×12 pixels is read out from the frame memory 10, and data of 10×10 pixels is read out from the frame memory 20. Then, in the same manner as in the prior art, motion vector detection at the third stage is carried out by data of 10×10 pixels and data of 8×8 pixels.

Then, data of 10×10 pixels corresponding to motion vectors at the third stage of data of 12×12 pixels in the work memory 48 are subjected to over-sampling by means of the over-sample circuit 74. Thus, data of 16×16 pixels are generated. These data are stored into the work memory 48. Similarly, data of 10×10 pixels in the work memory 44 are subjected to over-sampling by means of the over-sample circuit 72. Thus, data of 16×16 pixels are generated. These data are stored into the work memory 44.

Thereafter, the comparing operation by the full search of ±1 pixel in horizontal and vertical directions by blocks of 16×16 pixels is carried out. Thus, motion vector detection having the accuracy of 0.5 pixels in both horizontal and vertical directions is carried out.

Other embodiments

It is to be noted that this invention is not limited to the above-mentioned first and second embodiments by any means. For example, in the above-mentioned first and second embodiments, there is shown the case where motion vector detection is carried out at the three stages, but such a detection may be conducted at N-stages according to need. Further, the number of pixels of images subject to processing is not limited to the value in the abovedescribed embodiments, and the number of pixels of respective blocks may be generally L×M pixels.

In addition, the manner how to designate adjacent blocks to take into consideration adjacent motion vectors thereof at the time of determining an optimum initial vector is not limited to the manner in the above-described embodiments by any means. For example, while motion vectors of two adjacent blocks as shown in FIG. 2 in the above-mentioned embodiments, motion vectors of four adjacent blocks shown in FIG. 2 may be used.

What is claimed is:

1. A motion vector detector comprising a circuit wherein motion vectors are detected by using a block of L×M pixels as a unit between images An and Bn of respective hierarchies in which predetermined spatial sub-sampling operations are implemented to an input image A and a comparative image B at n-stages in both horizontal and vertical directions, motion vectors of adjacent blocks of motion vectors detected at the (i−1)-th stage are taken into consideration as an initial value of motion vector detection at the i-th stage, said detector further comprising a circuit for providing said initial value by using image data at the (i−1)-th stage corresponding to motion vectors of said adjacent blocks.

2. A motion vector detector comprising a circuit wherein, motion vectors are detected by using a block of L×M pixels as a unit between image An and Bn of respective hierarchies in which predetermined sampling operation are implemented to an input image A and a comparative image B at n-stages in both horizontal and vertical directions, motion vectors of adjacent blocks of motion vectors detected at the (i−1)-th stage are taken into consideration as an initial value of motion vector detection at the i-th stage, said detector further comprising a circuit for providing said initial value by using image data at the (i−1)-th stage corresponding to motion vectors of said adjacent blocks, wherein said detection circuit also comprises block readout means for detecting, at three stages, motion vectors of said input image and said comparative image as readout data, three storage means for holding motion vectors at said respective stages, matching means for allowing readout data on said input image side and on said comparative image side to be in harmony with each other to determine errors and trial vectors, and vector judgment means for making comparisons between errors of said trail vectors sequentially inputted on the basis of an output from said matching means to judge the compared results to determine a minimum error value and a trial vector corresponding thereto, thus to deliver said minimum error value and said trial vector corresponding thereto to block readout means on said comparative image side.

3. The detection circuit as set forth in claim 2, wherein said detection circuit further comprises work memories on said input image side and said comparative image side connected to frame memory groups for storing respective three frames of said input image and said comparative image respectively corresponding to first to third stages on said input image side and said comparative image side to read out data of input images and comparative images of said first to third stages from said frame memory groups on the basis of a command from said block readout means.

4. The detection circuit as set forth in claim 3, wherein said detection circuit further comprises pixel readout means provided between said matching means and said work memory on the input image side, and block selection means provided between said matching means and said work memory on said comparative image side.

5. The detection circuit as set forth in claim 2, wherein said detection circuit further comprises a stage block counter for respectively outputting readout commands to said block readout means on said input image side and said comparative image side in order to read out every stage's input images and comparative images of said first to third stages.

6. The detection circuit as set forth in claim 3, wherein said detection circuit further comprises an oversample circuit connected to said work memory and for implementing data of specific pixels in vertical and horizontal directions corresponding to motion vectors of the third stage of data in said work memory.

* * * * *